Dec. 30, 1941.    D. L. MILLER    2,268,051
KICK STAND
Filed June 24, 1940
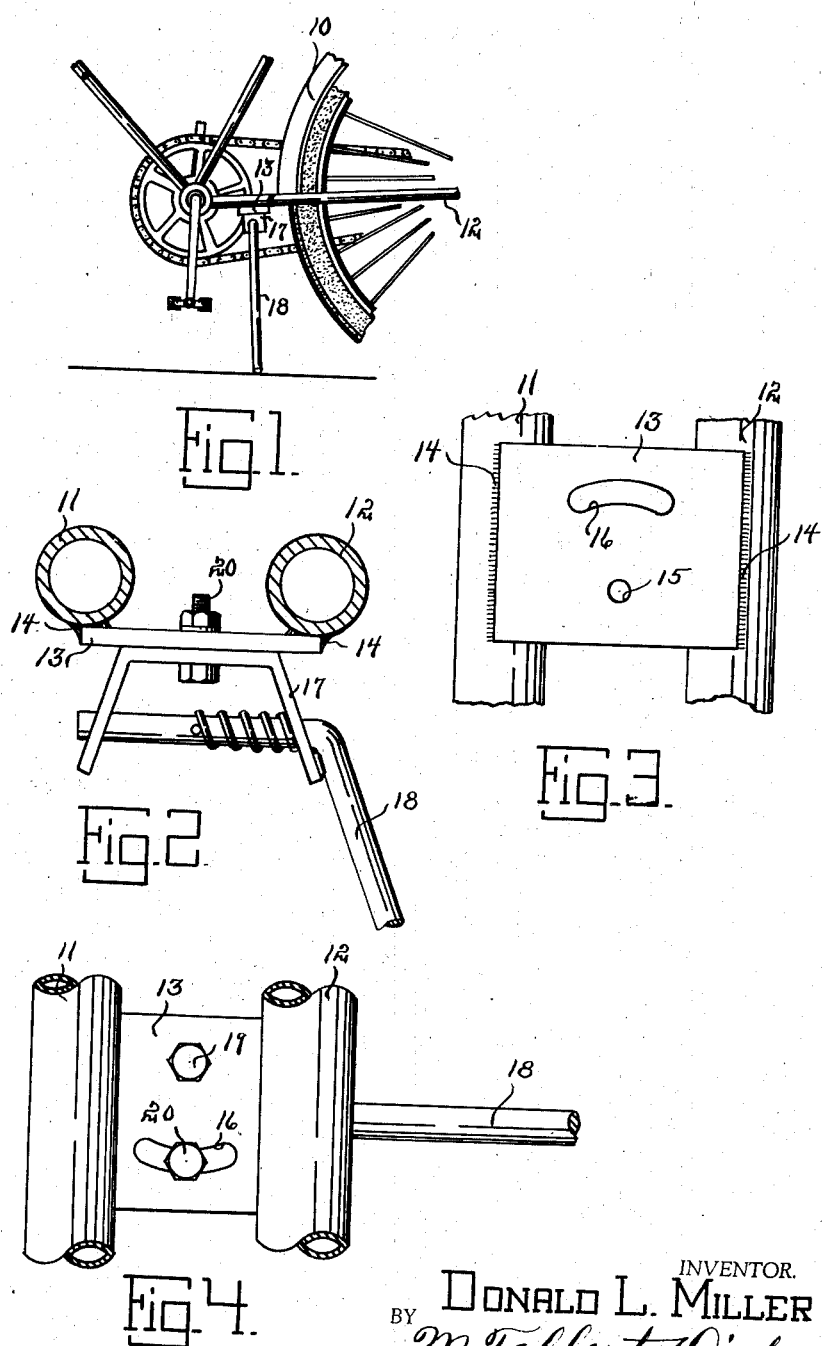
INVENTOR.
BY DONALD L. MILLER
M. Talbert Dick
ATTORNEY.

Patented Dec. 30, 1941

2,268,051

UNITED STATES PATENT OFFICE 2,268,051

KICK STAND

Donald L. Miller, Des Moines, Iowa

Application June 24, 1940, Serial No. 342,057

1 Claim. (Cl. 280—301)

The principal object of my invention is to provide a means of successfully attaching a bicycle kick stand to a bicycle.

A further object of this invention is to provide a rigid permanent method of securing a kick stand base to a bicycle frame.

A still further object of this invention is to provide a means for attaching a kick stand to a bicycle that is economical in manufacture, easily installed, and durable in use.

These and other objects will be apparent to those skilled in the art.

My invention consists in the construction, arrangement and combination of the various parts of the device, whereby the objects contemplated are attained as hereinafter more fully set forth, pointed out in my claim, and illustrated in the accompanying drawing, in which:

Fig. 1 is a side view of the hanger frame portion of a bicycle with my device attached thereon.

Fig. 2 is a cross sectional view of a portion of a bicycle frame with my device installed.

Fig. 3 is a top plan view of my plate base permanently secured to the bicycle frame.

Fig. 4 is a top plan view of my kick stand plate base installed and supporting a kick stand.

Kick stands for bicycles and motorcycles are very old. The chief difficulty of most stands, however, is that they are not easily attached to the bicycle or like and have a tendency to become loosened on the bicycles by use. I have overcome such objections as will hereinafter be appreciated.

Referring to the drawing, I have used the numeral 10 to designate in general a bicycle or like having the usual two parallel lower horizontal frame beams 11 and 12. It is to such a vehicle that I secure my device and which I will now describe. The numeral 13 designates a metallic plate secured to the bottoms of the frame beams 11 and 12 by soldering, welding or like 14 as shown in Fig. 2. This plate 13 has a width substantially that of the two frame beams, and is soldered or welded permanently along its two side edges to the bottoms of the two frame beams 11 and 12, respectively. By this construction the plate becomes an integral part of the bicycle frame, and cannot be removed. In the center area of the plate and between the two frame beams is a bolt hole 15 and a spaced apart circular slot bolt hole 16 as shown in Fig. 3. The mechanism of the kick stand proper is not important. Almost any type of kick stand may be successfully attached by slight modification and bolts to my base plate 13. In my issued Patent No. 2,049,218, I illustrate a type of kick stand that may be used, and in the present instance, I show such a type of stand. I have used the numeral 17 to designate the bracket plate of the kick stand having the usual kick rod support 18 rotatably connected to it. As is well known, a coil spring and catch means is employed to yieldingly hold the kick rod in an operative lowered position or an inoperative elevated position. In attaching such a stand, I use two bolts 19 and 20 which possess through holes in the kick stand bracket plate and the two holes 15 and 16 in the base plate. Before these bolts are tightened the kick stand bracket plate is slightly rotated to left or right to the desired position. This is made possible by the circular slot opening 16. After the proper position is obtained, the bolts are tightened thereby rigidly securing the stand to the permanently fixed plate 13.

From the foregoing, it will be readily seen that I have provided an excellent method of successfully securing a kick stand to a bicycle or like. If desired, the plate 13 may be secured to the bicycle at the bicycle factory.

Some changes may be made in the construction and arrangement of my improved method of and means for securing a kick stand to a bicycle or like without departing from the real spirit and purpose of my invention, and it is my intention to cover by my claim any modified forms of structure or use of mechanical equivalents which may be reasonably included within their scope.

I claim:

In combination with a bicycle having two lower horizontal frame beams, a kick stand, comprising, a base plate permanently and rigidly secured to said two frame beams, a bolt passageway in said plate, a slot bolt passageway in said plate, a bracket member, bolts extending through said bracket member and said passageways, and a kick rod rotatably secured to said bracket member.

DONALD L. MILLER.